(12) United States Patent
Lindaman

(10) Patent No.: US 6,481,147 B2
(45) Date of Patent: Nov. 19, 2002

(54) HUNTING DECOY ASSEMBLIES

(76) Inventor: Glenn Lindaman, 10 Madison La., Whitehall, PA (US) 18052-3733

( * ) Notice: Subject to any disclaimer, the term of this patent is extended or adjusted under 35 U.S.C. 154(b) by 0 days.

(21) Appl. No.: 09/757,016

(22) Filed: Jan. 9, 2001

(65) Prior Publication Data

US 2001/0004812 A1 Jun. 28, 2001

Related U.S. Application Data

(63) Continuation-in-part of application No. 09/329,287, filed on Jun. 10, 1999, now Pat. No. 6,216,382.

(51) Int. Cl.$^7$ ............................................. A01M 31/06
(52) U.S. Cl. ............................................................ 43/2
(58) Field of Search ............................... 43/2; 248/150, 248/156, 533; 446/487, 321, 330, 359; 29/DIG. 104

(56) References Cited

U.S. PATENT DOCUMENTS

| | | | |
|---|---|---|---|
| 529,463 A | 11/1894 | Roberts | |
| 892,528 A | 7/1908 | Kricke | |
| 1,366,710 A | 1/1921 | Anker | |
| 1,409,285 A | 3/1922 | Dennett | |
| 1,822,763 A | 9/1931 | Cook | |
| 2,011,480 A | 8/1935 | Gazalski | 43/3 |
| 2,137,799 A | 11/1938 | Brandenburg | 155/135 |
| 2,313,353 A | 3/1943 | Mills | 43/3 |
| 2,435,083 A | 1/1948 | Johnson | 43/3 |
| 2,439,710 A | 4/1948 | Banigan | 43/3 |
| 2,478,585 A | 8/1949 | Kouba | 43/3 |
| 2,545,800 A | 3/1951 | Viken | 43/3 |
| 2,662,327 A | 12/1953 | Petersen | 43/3 |
| 2,799,961 A | 7/1957 | Jaumotte | 43/3 |
| 3,245,168 A | 4/1966 | Pool | 43/3 |
| 3,470,645 A | 10/1969 | Mattson | 43/3 |
| 4,062,141 A * | 12/1977 | Shjeflo | 43/3 |
| 4,101,037 A * | 7/1978 | Allesch et al. | 211/167 |
| 4,251,937 A | 2/1981 | Curley | 43/3 |
| 4,339,887 A | 7/1982 | Streeter | 43/2 |
| 4,611,421 A * | 9/1986 | Jacob | 43/2 |
| 4,651,457 A * | 3/1987 | Nelson et al. | 428/16 |
| 4,660,313 A | 4/1987 | Bauernfeind et al. | 43/3 |
| 4,689,913 A | 9/1987 | Brice | 43/3 |
| 4,821,444 A | 4/1989 | Remus | 43/2 |
| 4,965,953 A * | 10/1990 | McKinney | 43/2 |
| 4,972,620 A * | 11/1990 | Boler | 43/3 |
| 5,003,722 A * | 4/1991 | Berkley et al. | 43/3 |
| 5,161,561 A | 11/1992 | Jamieson | 135/16 |
| 5,172,506 A * | 12/1992 | Tiley et al. | 43/3 |
| 5,233,780 A | 8/1993 | Overholt | 43/2 |

(List continued on next page.)

*Primary Examiner*—Charles T. Jordan
*Assistant Examiner*—Bret Hayes
(74) *Attorney, Agent, or Firm*—Duane Morris LLP

(57) ABSTRACT

A decoy assembly for a turkey or other decoy has an animal decoy body that can be a collapsible hollow form with an expander. The body is carried on a mounting that is adjustable in height, has a nodding feature by which the body can bow forwardly and aft, and also can rotate over a span that is limited to less than a full revolution. Several alternative arrangements are provided. The mounting can have a blade-like strip having a substantially greater width than thickness, fitted to the body and rotatable in a hollow tubular section of the a ground engaging stake part. The ground engaging part can have a radial inward crease that acts as an angular stop. The strip is preferably a spring and is aligned such that its greater width is lateral to the decoy body. Flexing of the body on the strip causes a fore-and-aft bobbing motion. According to alternatives, the mounting has telescoping tubes wherein a lateral pin through one interacts with an opening or a cam shaped end or a protrusion on the end of the other for limiting the rotation angle. The limited angular rotation and bobbing provide motions that are simulative of live animals and appear less artificial than unlimited free rotation, free bobbing in any direction and other potential motions.

13 Claims, 5 Drawing Sheets

U.S. PATENT DOCUMENTS

| | | | |
|---|---|---|---|
| 5,274,942 A | | 1/1994 | Lanius ............................. 43/2 |
| 5,279,063 A | * | 1/1994 | Heiges ............................. 43/3 |
| 5,289,654 A | * | 3/1994 | Denny et al. .................... 43/2 |
| 5,375,363 A | * | 12/1994 | Higdon ............................. 43/3 |
| 5,515,637 A | * | 5/1996 | Johnson ............................. 43/2 |
| 5,570,531 A | | 11/1996 | Sroka ............................. 43/3 |
| 5,632,110 A | * | 5/1997 | Roy ............................. 43/2 |
| 5,787,632 A | | 8/1998 | Kraut ............................. 43/1 |
| 5,826,364 A | | 10/1998 | Bitting ............................. 43/2 |
| 5,832,649 A | * | 11/1998 | Kilgore ............................. 43/2 |
| 6,070,356 A | * | 6/2000 | Brint et al. ..................... 43/2 |
| 6,092,322 A | * | 7/2000 | Samaras ......................... 43/2 |

\* cited by examiner

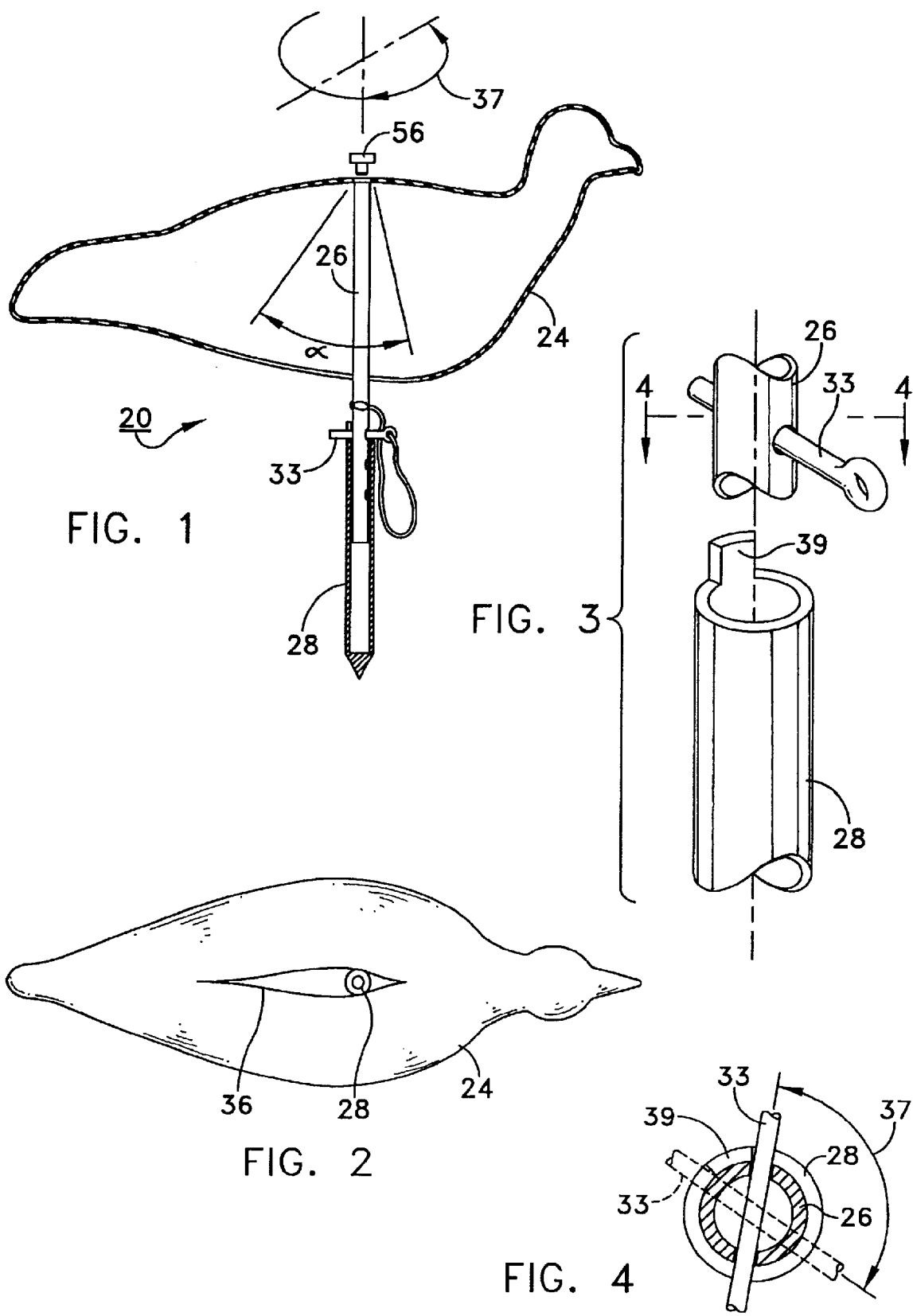

HUNTING DECOY ASSEMBLIES

CROSS REFERENCE TO RELATED APPLICATION

This application is a continuation-in-part of application Ser. No. 09/329,287, filed Jun. 10, 1999, now U.S. Pat. No. 6,216,382.

FIELD OF THE INVENTION

The invention concerns improved bird hunting decoys and supports for deployed decoys. A hunting decoy according to the invention, for example shaped and colored to represent a wild turkey, has a length-adjustable coupling between a decoy body and a ground support, for selecting a height of the body of the decoy clear of adjacent brush. The coupling is structured to permit free rotation over only a limited angular span around a vertical axis. This causes the body to face in different directions in changing wind without causing it to spin unnaturally. The decoy body can be hollow and flexibly collapsible, and the support can have a mechanical expander that holds the body in an inflated or expanded shape. The support for the body can have a flexible portion or link that allows a nodding movement in a fore and aft direction. The support also can be rigid but fixed flexibly at a point along the dorsal or back portion of the decoy body, and having a shaft that extends though a longitudinally elongated slot in the ventral or belly surface of the body, providing fore and aft clearance for the coupling member and/or ground stake. These arrangements permit the body to nod or bob forward and aft on the support.

The decoy as thereby structured can be deployed in a manner chosen to for the situation. The decoy has motion driven by external forces, specifically wind. The limited motion provides for a lifelike presentation that is more effective in attracting game than decoys having less natural motions such as motions without limitation on their span of displacement.

In one facing arrangement, a lateral pin interacts with a cam or stop surface to limit rotational freedom within a span not greater than 360 degrees. According to an alternative, the pin can interact with a cam defining a preferred facing direction. The structure facilitating nodding of the decoy body can comprise a directionally limited flexing structure, such as a flat spring strip, and this strip can be fixed in a receptacle to limit rotation, thus determining the direction of flexing or nodding. The flat strip can be oriented with its wider sides facing fore and aft and its narrower edges facing laterally of the body, which provides for a bobbing motion in the direction in which the strip is prone to flex. Using a rigid support stake or stand, the nodding is achieved by providing a degree of freedom between the body and the support.

BACKGROUND

Decoys are known in various shapes and colors to resemble specific animals, a familiar example being game birds. The decoys may be attractive to the corresponding species of game animal or to a different species, as a result of various instincts. These include (for example) social herding or similar safety-in-numbers instincts, predation or other expectation of finding food, opportunities for procreation, the urge to maintain territorial exclusivity, establishment of a place in a hierarchical pecking order, etc.

A decoy advantageously resembles a particular species accurately, at least as to attributes that a target species is inclined to notice. The decoy may be quite realistic, or may simply have critical attributes in common with the particular species it emulates, such as a comparable silhouette, color, movement, sound, odor, etc.

Decoys that appear realistic to humans are more popular among hunters than those that are obviously artificial. The target species may be prone to respond, positively or negatively, to the same aspects as humans, or possibly other aspects. Visually, many animals are highly sensitive to motion.

Visual mimicry is an important consideration, but not the only one. Decoys should be inexpensive to manufacture. The decoy should be compact or subject to packing in a manner that permits a hunter to carry a number of decoys into the field. The decoys should individually be very easy to deploy, quickly and silently, in any terrain that may be encountered, such as open grassland, woods or scrub vegetation.

It is an aspect of the present invention to make a decoy appear life-like because it exhibits a natural motion. The particular motion of the decoy can be as important to appearance as the shape and marking of the decoy body. This is particularly true of game animals such as turkeys, which are very sensitive to motion in their surroundings. The specifics of the motion matter. Unnatural motion can be at least as suspicious and/or unconvincing as a lack of any motion.

U.S. Pat. No. 5,570,531 describes a bird decoy with motion associated with the head and neck. The decoy body is stationary. A one-piece head-and-neck portion is mounted to the body so that the head and neck may tilt when sufficient wind prevails. The decoy is helpful in that it moves, but it is not representative of a live animal, whose motion is unlikely to involve displacement of an integrally rigid head and neck relative to a rigid stationary body, even when the animal is standing in place.

U.S. Pat. No. 5,515,637 discloses a decoy in which the decoy body is mounted on a vertical journal axis by bearings. The idea is for ambient breeze to rotate the body on the vertical journal axis without substantial frictional resistance. The journal axis advantageously is set precisely vertical. The weight of the decoy is advantageously balanced evenly on opposite sides of the axis. The mounting comprises a helical spring which enables the breeze to wobble the decoy in the incident direction of the breeze.

In a frictionless rotational mounting of such a type, it is possible that the decoy body may turn one way or the other on the vertical axis, due to wind or another impetus. Turning on a vertical axis may appear natural in some conditions and therefore could be interesting to a game animal. However the wind speed and direction must catch the decoy body just right. If the wind is not at the particular speed and oriented in the specific direction that produces the a convincing motion, the motion may be such that the decoy is caused to appear as an obvious fake. This problem is acute if there are several decoys deployed in a group. It might appear natural and interesting, for example, for decoys in a group occasionally to face in a new direction, for example as live animals in a group might face in unison toward the source of a sound. If decoys in a group rotate freely, a gust of wind could cause them to rotate in different directions and to continue beyond a full revolution. Such motion is mechanical and unrealistic.

If the rotation axis of a journal mounting is not at the center of mass, and the rotation axis is tilted relative to vertical, the decoy body will rotate preferentially to a stable rotational position at which the heaviest part of the decoy is at the lowest elevation. A gust of wind may act to rotate the body due to differences in surface area, for example exerting greater pressure on the thicker tail section than the thinner head section, causing a rotational force. This may rotationally displace the heaviest part of the decoy body from the angular position at which the heaviest part is at the lowest possible elevation. When the wind force subsides, the body tends to rotate back to the preferred orientation, because the heaviest part of the decoy body settles back at the preferred lowermost elevation. Typically, there is an associated rotational oscillation of a decreasing amplitude around the preferred rotational orientation, as the body settles back to the preferred orientation.

When deploying several decoys, particularly in a situation in which the decoys must be placed quickly and quietly before the hunter is spotted by the game, the hunter cannot take time to test and adjust the verticality of the rotation axes and the balance of the decoy bodies so as to face all the decoys in parallel or nearly parallel directions. Some of the ground stakes are likely to be set more near to vertical than others, which causes certain decoys in a group to be prone to rotate in the wind, while others do not. Even if care has been taken and the decoy bodies are all faced in parallel, balanced and aligned on vertical rotation axes, they may respond to a gust of wind by spinning around 360 degrees or more, possibly in different rotational directions, and may look obviously artificial.

A game animal is sensitive to motion and expects to see realistic motion in live animals. Suspicious unrealistic motion detracts from the effectiveness of the decoy. A group of decoy bodies that spin on their axes in a relatively uncontrolled and mechanical way, facing in random directions at any given time, and possibly spinning through more than 180 or even 360 degrees, is suspicious even if the static shape and color of the decoys is highly realistic.

A decoy is advantageously collapsible, for example being made of a thin flexible molded plastic. A molded plastic flexible turkey decoy is disclosed in U.S. Pat. No. 4,339,887. More or less collapsible decoys are disclosed, for example, in U.S. Pat. Nos. 3,470,645; 3,245,168; 1,822,763. These and the other patents mentioned herein are incorporated for their teachings regarding decoys, materials and methods.

Features that improve a decoy with respect to realism and other categories, should not add substantially to the cost, weight or bulk of the decoy. It would be advantageous if realism could be maximized, or at least if sensitive aspects affecting identification by the target species could be exploited, while preserving the advantages of known decoy arrangements.

SUMMARY OF THE INVENTION

The present invention is applicable generally to visual decoys that are intended to approximate the appearance of a particular species, and preferably to exhibit realistic forms of motion. The decoys may represent any species and/or gender to which animals instinctively respond. A particularly demanding subject as well as a good demonstrative example is the American wild turkey.

Wild turkeys are wary animals with acute senses. Male turkeys are territorial and will challenge another male turkey in an established geographical range. Turkeys of either gender may approach other turkeys to establish dominance in a pecking order. Turkeys are large birds but they can fly a substantial distance and thus can very quickly move about in response to situations.

The invention is described with reference to wild turkeys. The invention is also applicable to other particular species. For example, the invention can be applied to decoys representing animals that frequent dry land or water, mammals or birds, prey animals or predators, etc.

Common hunting practice for turkeys and other game may involve tracking or otherwise searching for likely locations, stalking, imitating audible calls, and deployment of one or more decoys followed by lying in wait. The decoys are advantageously lightweight and compact so as to be easily carried to wherever they may be deployed. The decoys need to be deployed quickly and quietly, i.e., assembled or otherwise erected so as to assume a stable realistic pose at a desired location.

U.S. Pat. No. 6,216,382, which is hereby incorporated in its entirety, discloses a collapsible flexible hollow decoy body with an expander mechanism that is opened when inserted into the decoy body to fill out the shape of the animal. The expander mechanism has a central shaft that is oriented vertically when the decoy is deployed and functions like the legs of the simulated animal, such as a turkey, to support the body above the ground. The central shaft can be pressed into the ground to support the decoy. Alternatively, for a rotatable mounting, the shaft can comprise a cylindrical part affixed to the body, that fits within a cylindrical shaped receptacle of a base part such as a tubular stake having a sharpened point that is pressed into the ground to support the assembly. Alternatively the central shaft can be hollow and can receive one end of a pin-like stake that is pressed into the ground. In either case, the decoy can rotate freely around a vertical axis defined by the central shaft.

The present invention seeks to employ the general structure of a decoy carried on a substantially vertical shaft with a rotational connection, to provide decoys that have a certain range of motions that better mimics the natural motion of live animals. Live animals may interact with one another, turn in unison to face a possible threat, but typically do not act randomly or mechanically. The present invention is directed to achieving a more natural appearance by providing motion limited in certain ways.

One aspect of the present invention is a decoy assembly including an animal decoy and a mounting mechanism for the animal decoy. In preferred embodiments arranged for combined height adjustment and limited rotation, the mounting mechanism has a telescoping configuration in which a shaft of a hollow body expander mechanism extends into a tubular ground stake. A series of holes are spaced along the expander mechanism shaft and a pin is inserted laterally through one of the holes. When the shaft is inserted in the stake, the pin rests against the top of the stake, thus fixing the height of the expander and the height of the decoy body. This permits the decoy body to be set at the necessary height to be visible over brush, without being so high as to expose its stilt-like support shaft.

The top end of the ground stake is cut out to form an angular stop or at least a stable orientation angle. The expander and the decoy body can rotate relative to the ground stake, thereby also rotating the pin in the lateral hole, up to the point at which the inserted pin abuts against an edge of the cut-out top of the ground stake. This permits adjustment of the decoy height and permits rotation only over a limited angular span.

According to another aspect the decoy body is permitted to bob or rock fore and aft on its support. According to one embodiment, the decoy body is a flexible plastic molding and is attached to a support shaft by a screw passing through the back of the body into the end of the support shaft. The support shaft fits into the ground stake as discussed above. The opposite (ventral) side of the decoy body is provided with an elongated slot extending forward and rearward from the supporting shaft and stake. This slot provides clearance for the body to tilt forward or rearward relative to the support shaft and stake, providing a bobbing action.

According to another alternative, the bobbing action can be provided by means of a blade-like flexible spring member fixed between the support shaft and the ground stake. The stake is pressed into the ground and forms a stable substantially vertical base. The decoy body can be engaged directly on the top end of the spring member, or more preferably, the spring member can attach to the body via an expander mechanism and can have vertical displacement and limited rotational capability as discussed.

The spring member is a thin flat strip oriented such that the longer dimension of its cross section is lateral to the decoy body. The strip thus bends freely in a direction that corresponds to the decoy body bobbing forward and rearward, and not laterally (the body is free to pitch but not to yaw).

These and other aspects of the invention will be apparent to those skilled in the art in view of the following discussion and the appended claims.

BRIEF DESCRIPTION OF THE DRAWINGS

There are shown in the drawings certain exemplary embodiments of the invention as presently preferred. It should be understood that the invention is not limited to the embodiments disclosed as examples, and is capable of variation within the scope of the appended claims. In the drawings FIG. 1 is a longitudinal section view of a hunting decoy assembly according to the invention, having height adjustment and limited bobbing and lateral facing movements.

FIG. 2 is a bottom plan view thereof, showing certain decoy body details associated with bobbing movement.

FIG. 3 is a partial perspective view showing the detailed structure of the body mounting shaft and ground stake, associated with lateral rotational facing movements over a limited angular span.

FIG. 4 is a schematic plan view, in section, showing the operation of the structure shown in FIG. 3.

DETAILED DESCRIPTION OF THE PREFERRED EMBODIMENTS

Figure 5:
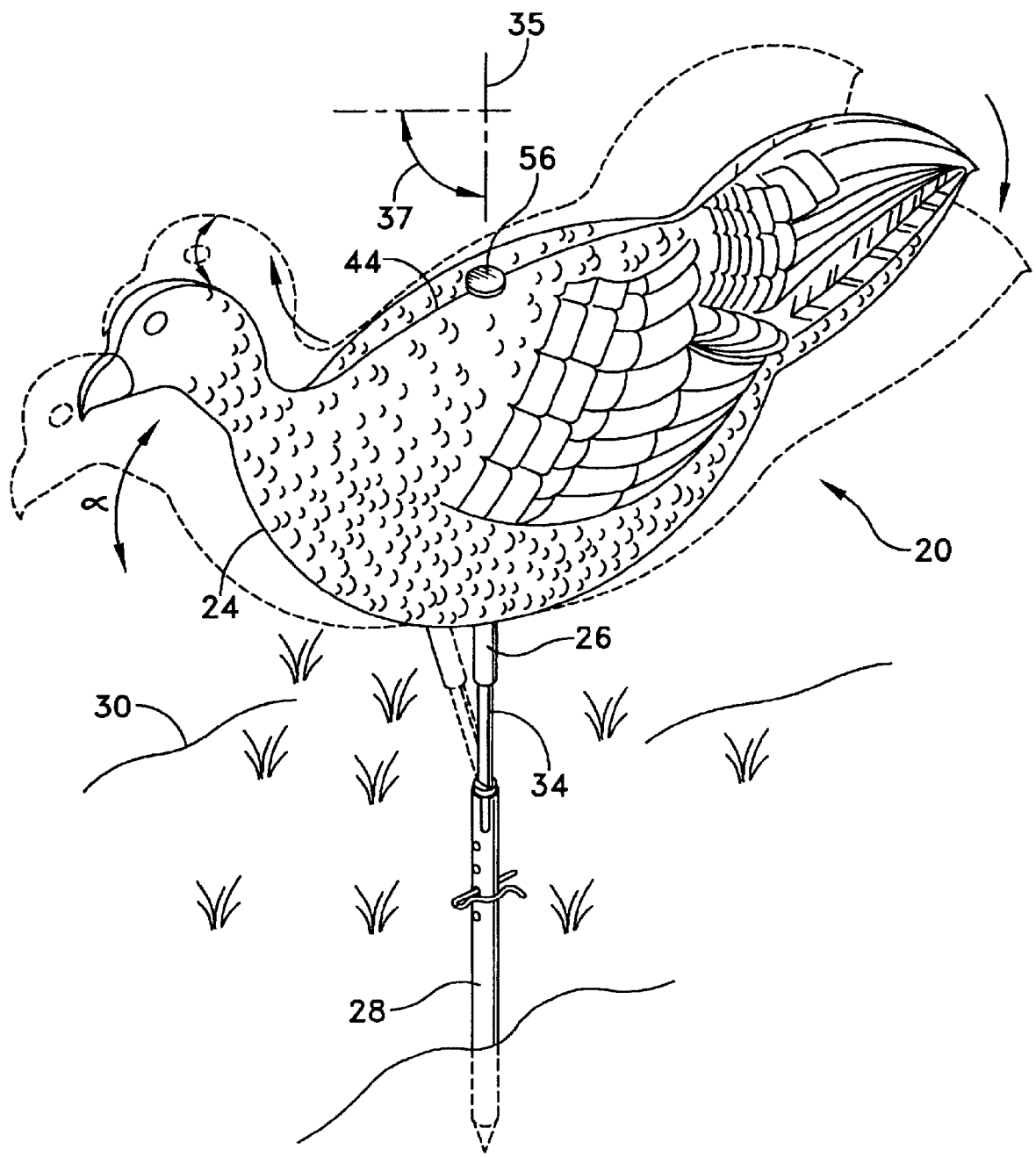
FIG. 5 is a perspective view showing a decoy assembly according to an embodiment of the invention having a flexible spring member coupled to the mounting stake for defining a bobbing movement.

FIG. 1 illustrates a hunting decoy assembly according to an aspect of the invention, specifically a turkey decoy, shown in cross section through a medial plane. The assembly generally comprises a hollow decoy body 24 supported on a ground stake 28. A mounting shaft 26 telescopes with the ground stake 28 and extends into engagement with the decoy body. According to an inventive aspect, the telescoping connection of the shaft 26 and stake 28 is fixable at discrete height positions by setting a lateral through-pin 33 in one of several spaced lateral holes in shaft 26. When the shaft 26 is inserted into stake 28, shaft 26 telescopes into stake 28 until pin 33 abuts against the top of stake 26. This supports that decoy body vertically, and defines a rotation axis 35.

According to another aspect, the decoy body of the invention is arranged to tilt forward or rearward under action of the wind or other force. In the embodiment of FIGS. 1 and 2, the upper end of the body mounting shaft 26 is attached to the dorsal portion of the body 24 by a fastener 56 such as a screw, which is threaded into shaft 26 through the thin hollow body material. Along the opposite or ventral side of body 24, an open slot 36 extends along the median of the decoy body 24, and provides clearance for shaft 26 and/or stake 28 to extend through the ventral wall of body 24. In addition, slot 36 extends for a distance forward and rearwardly from axis 35 and shaft/stake 26/28. In a preferred embodiment the slot 36 is about 25 cm in length, whereas the shaft is about 7 mm outside diameter and fits into a stake that has a slightly larger inside diameter, e.g, 1 cm.

The flexibility of the body 24, and the play in the attachment between the top of shaft 26 and the wall of body 24 permit the decoy body to deflect or bob forward and backward up to the point at which the shaft 26 or stake 28 abuts the end of slot 36. The body 24 can be made with a flexible vinyl or similar material, for example 1 mm thickness, to permit flexing. This thickness also allows the user to collapse the body easily.

If the user tightens the fastener 56 snugly, the body 24 is rotationally fixed to the mounting shaft 26 and the flexing of the body defines the extent of bobbing that occurs under force, e.g., from wind. It is not necessary to fix the fastener 56 snugly, however, and some pivoting preferably occurs between the body and the top of the shaft 26. Nevertheless, the slot 36 determines the direction in which the decoy body can bob. Inasmuch as slot 36 extends longitudinally, the decoy body is guided by the interaction of the slot and the shaft (or stake) and limited to bobbing in a fore and aft direction. The maximum extent of bobbing is also defined by the slot, namely limited to an angle $\alpha$ between the extremes at which the ends of the slot abut against the shaft or stake.

As discussed above and shown in FIG. 1, the height of the decoy body is selectable by the user, namely by setting a transverse pin 33 at a selected one of several holes spaced along at least a part of mounting shaft 26. Pin 33 can be tethered to the shaft as shown. Shaft 26 telescopes into stake 28 by gravity, until pin 33 rests on the top of stake 28. This same structure provides a means to permit the decoy to rotate back and forth on axis 35 while limiting the rotation to a particular angular span 37.

As shown by the embodiment of FIGS. 1–3, a longitudinally protruding extension tab 39 is provided in the upper end of stake 28 to provide a bidirectional abutment that is encountered by the opposite ends of pin 33 when the shaft 26 rotates relative to stake 28, stopping further rotation. Thus the span 37 of angular displacement is limited to less than 180 degrees. By providing an extension tab that encompasses a greater portion of the circumference of stake 28, which is tubular in the embodiment shown, the angular displacement can be limited to a smaller angle.

According to the embodiment of FIGS. 1–4, the decoy body is provided with movement but the movement is limited to certain natural movement directions. The body can bob forward, as a live animal might move to peck at an item on the ground, or bob rearward, as if raising its head for a better view over obstructions. The body cannot bob beyond a particular angle defined by slot 36, such as 30 degrees or 45 degrees. The bobbing is damped by flexing against the resilience of the decoy body 24. The body cannot bob or oscillate laterally in an unnatural manner.

Similarly, the body 24 can be moved by the wind to rotate on a vertical axis and to face in a different direction. Such facing movements are also limited to less than 180 degrees due to the interaction of protruding stop 39 and the lateral pin 33 that also selectably determines the deployed height of the decoy body.

FIG. 5 illustrates the motions of the invention in a perspective view, and illustrates some additional embodiments and variations. A decoy assembly 20 in this embodiment includes a decoy body 24 deployed for use to attract or otherwise interest a game animal and can comprise a flexible hollow body form carried on a support member 26 as above. In a preferred arrangement, the shaft 26 carries an expander that can be manipulated by the user to force open the hollow interior of a molded body that may have been folded or otherwise collapsed for transport. The body can also be a solid form such as compressible foam plastic or the like. The decoy assembly 20 shown is supported by a mounting stake 28 that pierces the ground 30 or otherwise is supported on and more or less rigidly fixed to the ground. In this embodiment, directionally limited bobbing motion is provided by a flat strip or blade-like spring 34, that is carried on the mounting stake 28 and supports the decoy body 24 on stake 28. The blade-like spring 34 occupies part of the distance between the body 24 and the top of the mounting stake 28 in the embodiment shown. It is one aspect of the invention that the decoy body 24 is permitted to rotate around an axis 35 defined by the stake 28, over a limited angular span 37 that in this case is determined by the engagement of the blade-like spring 34 in the stake 28. It is another aspect of the invention that the blade like spring 34 provides a flexible coupling that allows the body to bob forward or rearward relative to the axis of rotation 35 defined by the stake 28, but only in the two opposite directions in which the flat strip of spring 34 are readily flexible. It is a further aspect that the overall height of the decoy assembly 20 is made adjustable by the mounting of the blade-like spring 34, such that the decoy body 24 can be placed at a height appropriate to be visible above any obscuring vegetation 42.

Figure 6:
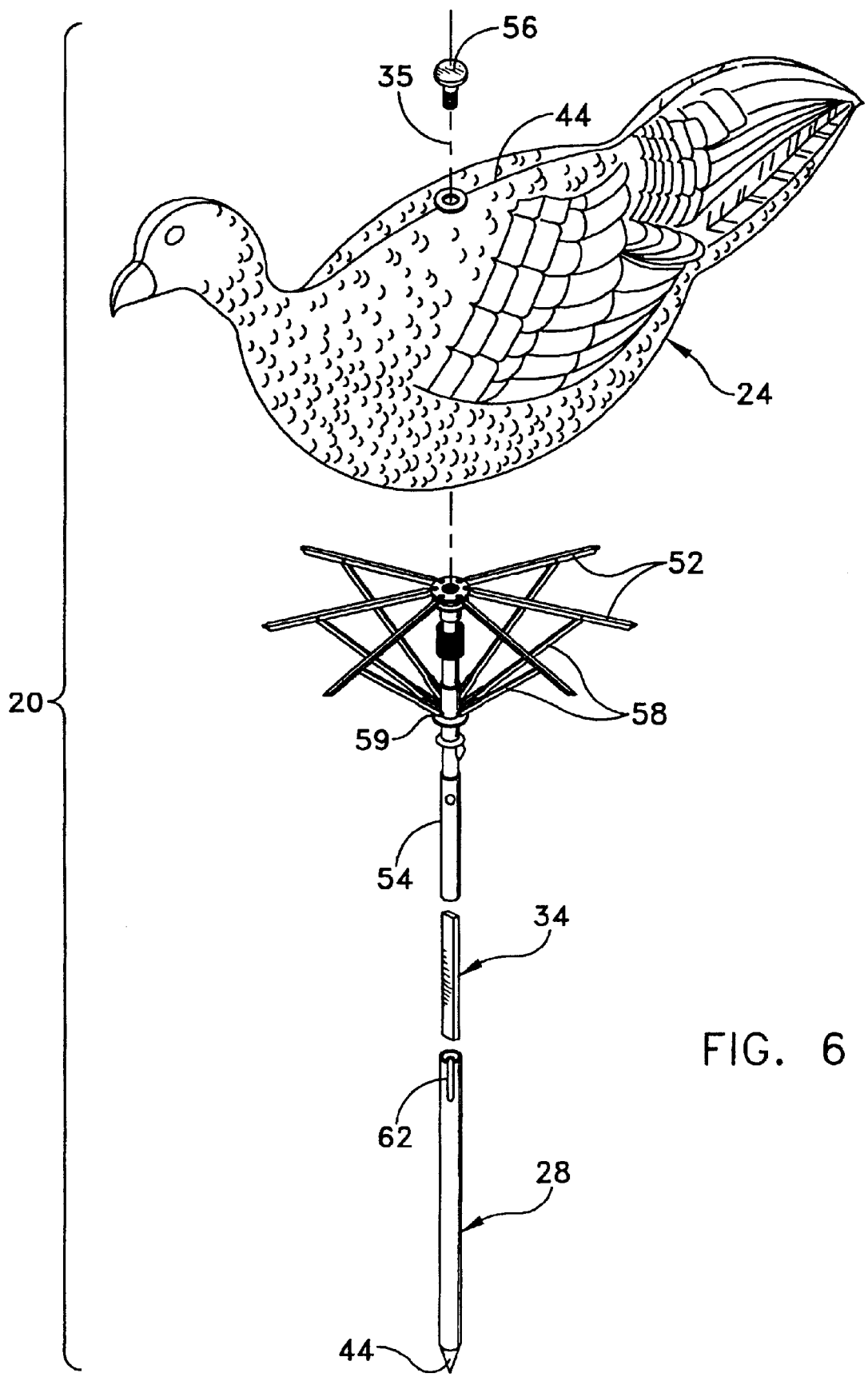
FIG. 6 is an exploded perspective view a decoy assembly according to FIG. 5, using a hollow body expander mechanism.

Referring to FIGS. 5 and 6, the decoy assembly includes an animal decoy body 24 and a mounting mechanism for the animal decoy body containing a body expander. The mounting mechanism has a ground-carried first part, namely stake 28 and any appurtenances thereto, and a second shaft part 26 affixed to the animal decoy body 24. Shaft 26 can be attached to the body 24 or can be an integral extension of the body. The stake part 28 and the shaft part 26 are relatively rotatable about a substantially vertical axis 35 relative to the decoy body, over a span limited to less than 360 degrees.

The blade-like spring 34 flexes or bends in a direction that is lateral to the axis of rotation 35, and specifically is along a line perpendicular to the flat face of the spring 34. The spring is oriented to flex in a direction permitting the decoy body 24 to move over a bobbing span or angle α, shown in FIG. 5. The spring or the shaft 26 holding the spring can rotate relative to stake 28 to permit the body to move over a facing span or angle 37. The flexing direction is aligned along the longitudinal midplane 44 of the animal decoy body 24. In this way the animal decoy body 24 preferentially flexes in a natural fore and aft direction rather than wobbling laterally.

The blade-like spring 34 in the embodiment of FIGS. 5 and 6 is coupled between the decoy body 24 and the ground stake 28 of the mounting mechanism. There can be any number of coupling relationships between the body and the ground. According to the invention, at least one of these relationships permits relative rotation over a limited angular span, i.e., at least more than zero, and preferably there is a facing movement rotation on axis 35 and a bobbing rotation or flexing. At least one of the relationships preferably is telescoping.

In the embodiment shown in FIG. 5, the blade-like spring 34 can be fixedly attached in the body 24. In FIG. 6, the body 24 and mounting mechanism as shown comprises a hollow flexible plastic shell body and an expander or support 26 with laterally extendable portions 52 that push the hollow shell outwardly into the appropriate animal shape. The expander mechanism has a support shaft 54 that extends through an opening in the belly area of body 24 and is attachable to the back or dorsal part of the body 24 by fastener 56 passing through the hollow shell and into the end of the expander support shaft 54. The expander support shaft 54 resembles the shaft of an umbrella and has one or more linkage parts 58 that are pivotably attached to the laterally openable parts 52 which can pivot at the end of the expander support shaft 54. In the embodiment shown, the linkage parts extend between the laterally extendable parts 52 and a hub 59 that is manually movable along the expander support shaft 54. The hub 59 can be spring biased to collapse the expander, unless held in an open position by a radially depressible spring pin that blocks axial movement of the hub 59 after the hub is passed over the spring pin, similar to operation of an umbrella. This arrangement is also similar to that disclosed in U.S. Pat. No. 6,216,382, which has been incorporated herein by reference.

As also shown in FIG. 6, blade spring 34 extends between the support shaft 54 of the expander and the ground engaging stake 28. The blade spring 34 can be press fit or similarly attached to the support shaft 54 of the expander, and preferably is affixed rigidly. The bottom part of the blade spring fits into the stake member 28 in a movable manner illustrated by FIGS. 7 and 8.

Figure 8:
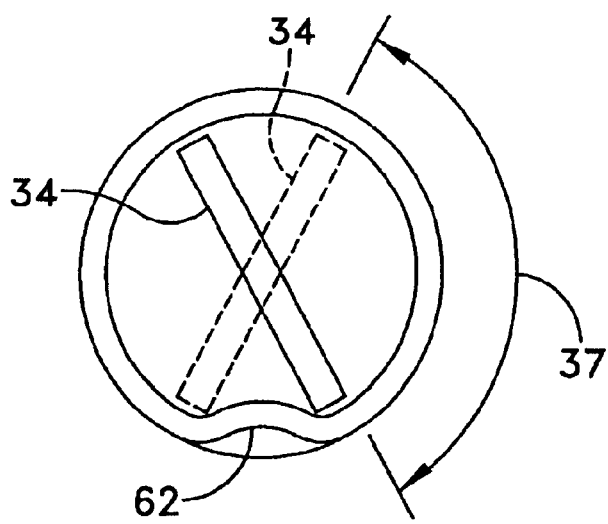
FIG. 8 is an axial section view through the mounting of the blade-like spring shown in FIG. 7.

The top part of the blade spring preferably is rigidly affixed to the animal body, for example in the support shaft 54 of an expander or like device that assumes or maintains a given angular relationship with the decoy body. Referring to FIG. 8, the lower part of the blade spring 34 extends into the stake 28 in a telescoping manner, which permits relative rotation of the blade-like spring 34 and the stake 28, the latter being fixed in the ground or otherwise non-rotatable relative to the ground when deployed.

Figure 7:
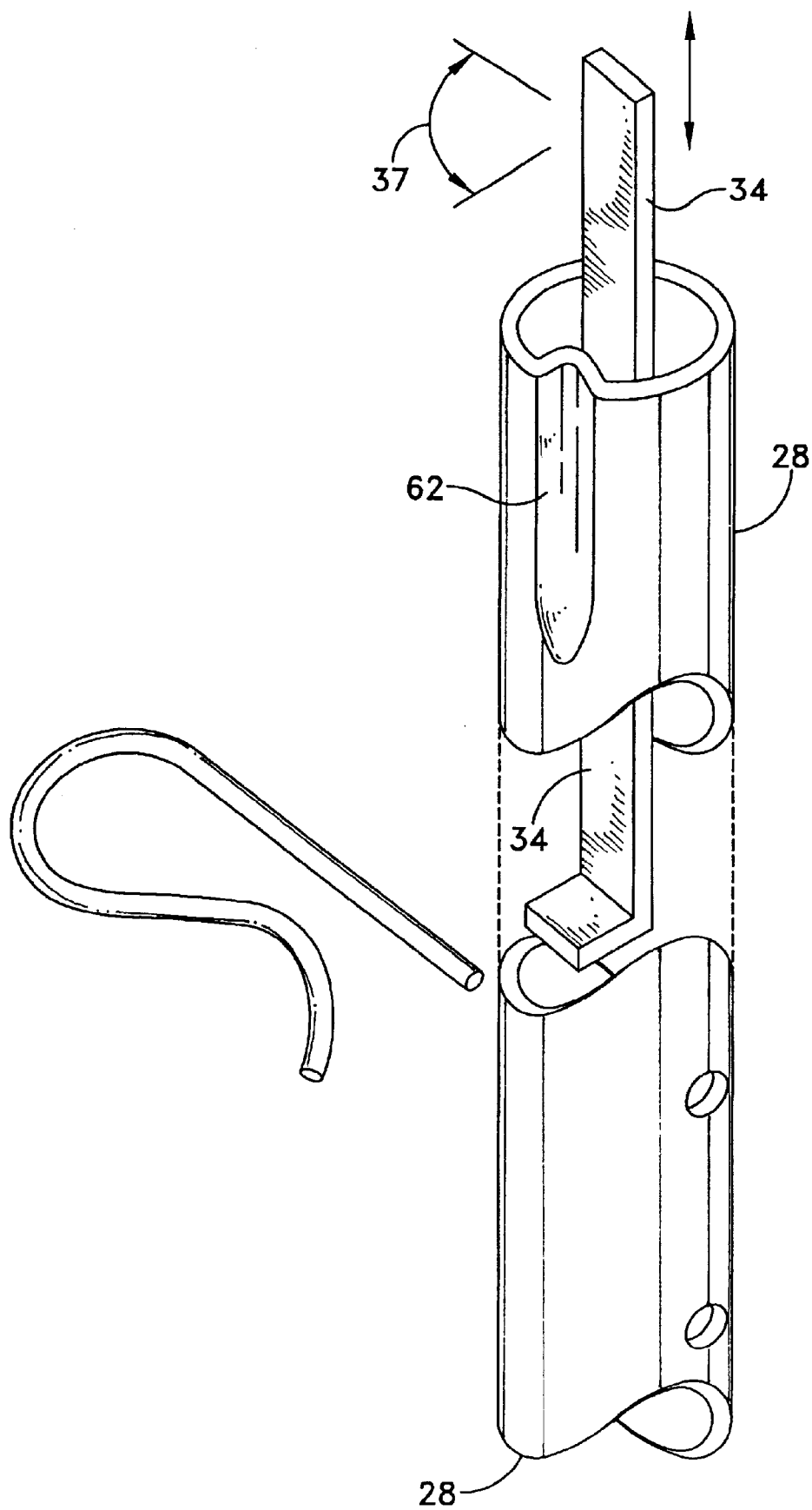
FIG. 7 is a partially cutaway view showing an alternative structure for providing telescoping height adjustment, facing and bobbing movements.

At least one stop 62 is formed in the stake part 28 as shown in FIGS. 7 and 8. The stop and the spring are dimensioned and positioned to abut the blade spring 34 at least at one rotational position of the animal decoy body relative to the ground engaging stake 28.

Stake 28 comprises a tubular portion, namely a hollow cylinder receiving the blade-like portion as shown in FIG. 7. Stop 62 can be formed in any of various ways which reduce the inside diameter of the tubular portion to less than the width of the blade-like spring 34, and therefore provide an angular stop. When the blade-like spring 34 rotates back and forth, it encounters the stop 62 on one and then the other side of the blade-like spring, in each case at the limits of its angular span.

In FIG. 7, the angular stop 62 is formed as a crimp or crease, namely a local reduction of the diameter of the tube over a limited angular span relative to the longitudinal or rotation axis, extending over at least a short longitudinal distance. This reduction in diameter or crease defines an angular stop 62 on the inside surface of the ground engaging tube part 28, which stop is encountered by the blade-like spring 34, provided the width and/or thickness of the blade-like spring are such as to occupy a greater inside diameter of the tubular portion than the reduced diameter of tube part 28 at the crease.

The effect of the stop 62 on the angle of possible rotation of the blade-like strip or spring is illustrated in FIG. 8, and the effect on the decoy body 24 is shown in dotted lines in FIG. 5. The blade-like strip 34 carries the decoy body (not shown in FIG. 8) and the tubular part 28 bearing the crease is fixed relative to the ground. The decoy body 24 may be caused to rotate, for example, by the wind, or may be caused to flex blade like strip 34 in a bobbing motion, which is also shown in dotted lines in FIG. 5. As to rotation, if the starting position of the blade-like spring 34 is as shown in solid lines in FIG. 8, wherein one lateral edge of spring 34 rests against the stop 62, the decoy body 24 can rotate counterclockwise until the opposite lateral edge abuts against the opposite side of stop 62. The angular span in this arrangement is necessarily less than 360 degrees. In the relative dimensions shown in FIG. 8, which are merely exemplary, the permitted angular span is about 120 degrees. It will be appreciated that the permitted span can be made smaller, including angles of 90 degrees or less, by enlarging the relative size of the crease as shown in FIG. 8 or by providing two angularly spaced creases as stops. Additionally, the stops need not be formed only by creases. Fasteners such as screws or rivets or other structures can be mounted to protrude inwardly from the wall of the tubular portion of the stake part 28, so as to extend radially inwardly sufficiently to form stop 62 for the blade-like spring 34.

The blade-like spring 34 of the mounting mechanism for the decoy body 24 is a resilient member having a flexing direction aligned to the longitudinal midplane 44 of the animal decoy body 24, such that the animal decoy body preferentially flexes in a fore and aft direction. When combined with the limited rotational freedom of the mounting, the decoy of the invention resembles animals which bob their heads and/or bodies in a fore-and-aft direction, but generally face in a given direction although they may turn from side to side by action of the wind for plus or minus 45 or 60 degrees or the like, as defined by the stop. The bobbing of individuals among a group of deployed decoy bodies, together with general reorientation of the bodies over a limited angular span only, is more lifelike and interesting to game animals (generally other birds of the same species), than a wholly rigid decoy or a decoy that spins freely in the wind and thus appears machine like rather than lifelike.

FIG. 7 also illustrates that in addition to flexing and rotating, the decoy of the invention can be height adjustable. The blade spring in this embodiment is limited in the extent to which the spring can slide telescopically into the stake part. In the embodiment shown, the bottom end of the blade spring is bent in an angle, such as a right angle, leaving sufficient space to pass the angular abutment when assembling the device. A series of through holes are provided in the stake at spaced longitudinal positions or heights along the stake. The user chooses the decoy height by placing a cotter pin or spring pin or similar abutment laterally through to block the inside of the tube against telescoping of the blade-like spring to a point lower than the cotter pin. Other similar arrangements can achieve a similar results, such as placing a press-on foot on the bottom of the blade-like spring or otherwise blocking the stake member along its longitudinal axis.

Figure 9:
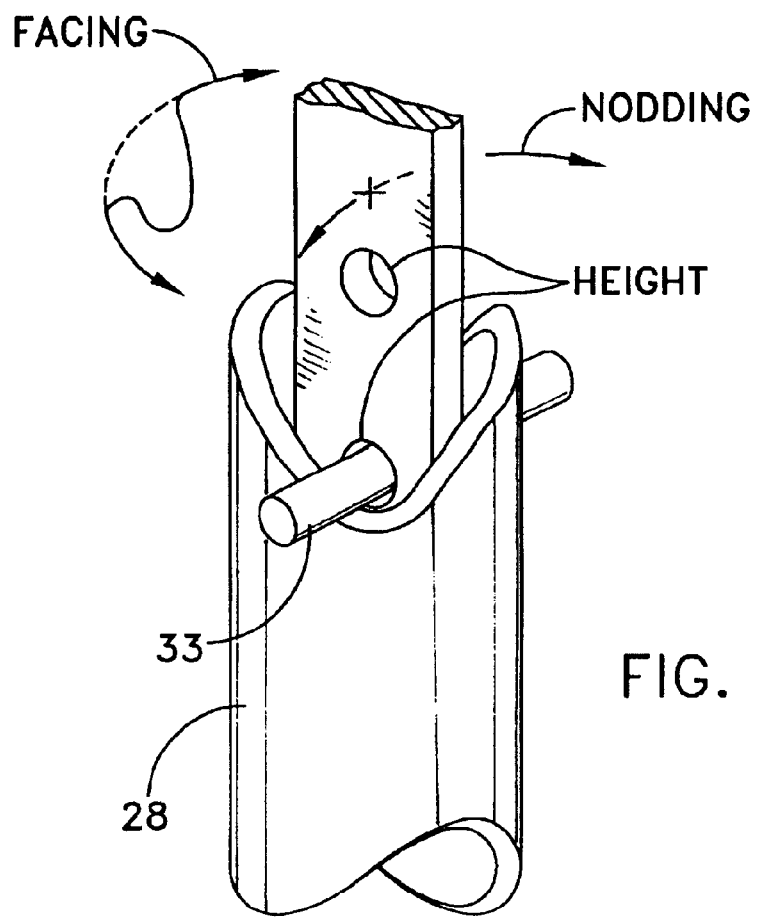
FIG. 9 is a partial perspective view of an alternative embodiment having facing, nodding and height adjustment aspects.

FIG. 9 shows an additional variation wherein a cam-shaped edge is defined along the top of stake 28, such that the preferred facing direction of the decoy is a direction in which the pin 33 is at the lowest elevation of a cam edge on stake 28. The pin 33 can be arranged to extend through both shaft 26 and stake 28 to set the height, one of shaft 26 and stake 28 having lateral holes complementing pin 33, and the other having a slot extending by an angular span that defines the maximum span of facing movement.

In the embodiment shown there are a plurality of vertically spaced openings for pin 33, the choice of which fixes the vertical position of the strip 34 and thus selects the height of the decoy. Preferably a sufficient range of height is provided to set the height of the decoy above the level of surrounding vegetation, such as hay in a field that may or may not have been recently mowed.

In the embodiment shown in FIG. 9, there are plural holes in strip 34 and the pin 33 rides on the top edge of stake 28 as the cam edge. It would also be possible to provide a series of spaced openings in stake 28, each having a curved cam edge over an angular arc (e.g. 30 degrees) in which the decoy body is free to pivot.

Decoys according to the invention can be of any game type and can be mass produced identical moldings, or custom made ones of a kind. Exemplary decoy types are those that resemble commonly hunted species with social, territorial or similar instincts, such as turkeys, ducks, geese, pheasants, and the like. The decoys may be made of any suitable material, but preferably the material is lightweight for easy transportation. A lightweight body facilitates the motion of the decoy according to the invention, as explained in detail below, under the effects of ambient breeze, from light breezes to moderate or brisk winds.

The decoy or decoy assembly according to the invention is arranged so that under the influence of a breeze, the decoy body can move in a direction perpendicular to a longitudinal axis through the mounting stake and along the medial plane of the decoy body, namely to bob fore and aft. This motion of the decoy in the case of a turkey resembles an animal bobbing for feed or walking forward with a bird-like gait.

Suitable turkey decoys useful in connection with the present invention are described in U.S. Pat. No. 6,216,382, the disclosure of which is hereby incorporated in its entirety.

By "blade spring" or blade-like spring, as used herein, is meant a substantially flat spring strip, wider than it is thick, preferably made of a flexible metal material such as spring steel and exemplified by the strip 34 shown in the drawings. For example, the spring can be a flat strip of one half to two centimeters in width and one or two millimeters in thickness. Other dimensions are possible provided the spring has strength sufficient to support the decoy with which it is used, and sufficient flexibility to flex under the influence of a usual breeze. For example, a leaf spring is suitable.

Generally, the flexibility of the connection between the body and the base can be modified by varying the length of the portion of the spring that extends from the mounting stake. A greater length of spring extending between the body or the mounting to the body and the ground engaged mounting stake, generally increases the flexibility of the connection and leads to a bobbing decoy motion of a greater amplitude and lower frequency. A stiffer or shorter spring decreases the amplitude and increases the frequency. It is preferred that the amplitude be substantial, for example up to about 30 degrees forward and 30 degrees backward from vertical, and that the frequency be low, for example less than about two Hertz, so as to resemble a live animal walking, feeding and looking about.

The length extension of the mounting can be made adjustable at the user's choice, with the benefit that the height of the decoy can be adjusted to place it higher than tall grass or low brush. This tends also to affect the flexibility of the spring connection.

In a preferred embodiment, the decoy or decoy assemblies according to the invention are also arranged to rotate about a longitudinal axis through the mounting stake over a limited angular span. Rotation is coincident with rotation of the blade-like spring member relative to the base or relative to a support member for the decoy body to which the spring member is attached. The decoy is in turn attached to the support member.

For improving realism, structure is preferably provided to prevent the decoy from rotating through 360° about the longitudinal axis, which appears unnatural and decreases the effectiveness of the decoy. Accordingly, preferably the mounting stake contains therein one or more elements that are capable of stopping the rotation of the decoy. An element capable of stopping the rotation of the decoy may be, for example, a radial inward extension such as a longitudinally elongated crease in a tubular member carrying the spring member. In the embodiment in which the spring comprises a blade-like strip 34 extending in a telescoping manner into a tubular portion of the mounting stake 28, the internal diameter of the tubular portion can be slightly larger than the width of the blade-like strip, allowing relative rotation, except at the crease or stop 62, where the inside diameter of the tubular portion is less than the width of the strip 34. Thus the strip and the decoy body can only rotate up to the point at which the strip contacts the inside part of the tubular portion at the crease.

The extent to which the crease limits the rotation of the spring depends in part upon the size of the crease, which can be made wider or narrower to either limit or increase the angular span possible. Alternatively, in place of a crease, an inward protrusion such as a nail, pin, flap etc. can be used to stop the rotation of the blade.

The crease can be made in a conventional manner as used in swaging, namely to compress the tubular portion circumferentially while forming a radial depression at the crease. In the embodiment shown, one crease is provided to form one abutment. Two creases or other radial indentations of the inside diameter can be provided at angularly spaced positions to define the rotational limits.

The limited rotational fitting can be between a spring strip fixed in the ground engaging stake or pillar member and telescopically carried in a tubular member fixed to the decoy body. Alternatively, the limited rotational fitting can be between a spring strip fixed to the decoy body and telescopically carried in the ground engaging stake or pillar.

The rotational axis can be placed off center in the decoy body, and in the embodiment shown the body is generally elongated rearwardly from the rotation axis. As a result, the body rotates on base member in the manner of a weathervane in the ambient wind, but only to the point permitted by abutment of the rotational fitting against its limits. The motion contributes to the realism of the simulation presented by the decoy, particularly if the wind causes several adjacently deployed decoys to rotate to face upwind. Advantageously, however, the decoy body cannot spin on its mounting and instead the motion is generally such that the body faces in one direction or another and moves between those positions.

In an alternative embodiment, the limited rotational aspects of the invention can be combined with a telescoping arrangement. In one embodiment, the bottom end of the spring strip is fitted into a cylindrical bushing. The spring strip and bushing (the latter being small enough to pass the crease, which is preferably at the end of the tubular member) are inserted into to the tubular member to a point defined by a cotter pin or the like that is inserted at the user's option at any of several spaced through holes along the tubular member. This permits the user to adjust the overall height of the decoy, which is useful to place the decoy above the level of tall grass if necessary, or lower if the terrain permits.

The invention having been disclosed in connection with the foregoing variations and examples, additional variations will now be apparent to persons skilled in the art. The invention is not intended to be limited to the variations specifically mentioned, and accordingly reference should be made to the appended claims rather than the foregoing discussion of preferred examples, to assess the scope of the invention in which exclusive rights are claimed.

What is claimed is:

1. A decoy assembly comprising: an animal decoy body; a mounting mechanism for said animal decoy, comprising a ground-carried first part and a second part affixed to the animal decoy body, wherein the first part and the second part are relatively rotatable about a substantially vertical axis relative to the decoy body, over a span simulating a facing movement of the animal decoy body, the span being greater than zero and less than 360 degrees.

2. The decoy assembly of claim 1, wherein the mounting mechanism is length adjustable.

3. The decoy assembly of claim 2, wherein at least one of the first part and the second part has a plurality of spaced openings and receives a pin coupled to the other of the first part and the second part for fixing a height of the decoy.

4. The decoy assembly of claim 1, wherein the mounting mechanism comprises a resilient member having a flexing direction aligned to a longitudinal midplane of the animal decoy body, such that the animal decoy body flexes substantially only in a fore and aft direction.

5. The decoy assembly of claim 4, wherein the resilient member comprises a blade-like spring having a top and a bottom, the bottom of the spring being rotatably fitted into the ground carried first part of the mounting mechanism and the top being fixed relative to the animal decoy body, and further comprising at least one stop in the ground carried first part, positioned to abut the spring at least at one rotational position of the animal decoy body relative to the ground engaging first part.

6. The decoy assembly of claim 5, wherein the tubular portion has a crease extending over a longitudinal distance, an inside of the crease defining the stop.

7. The decoy assembly of claim 1, wherein the mounting mechanism comprises a resilient member having a flexing direction aligned to a longitudinal midplane of the animal decoy body, such that the animal decoy body preferentially flexes in a fore and aft direction.

8. The decoy assembly of claim 7, wherein the mounting mechanism comprises a blade-like spring having a top and a bottom;

a substantially hollow mounting stake disposed about said bottom of said blade-like spring;

a support member for said animal decoy mounted at said top of said blade-like spring;

wherein at least a portion of said blade-like spring extends from said mounting stake.

9. The decoy assembly of claim 8, wherein said mounting stake is substantially cylindrical and comprises a central longitudinal axis, and wherein at least two of the stake, the support member, the blade-like spring and the decoy body are selectively fixable for setting a height of the decoy assembly.

10. The decoy assembly of claim 9, wherein said substantially cylindrical mounting stake comprises a groove parallel to said longitudinal axis and extending inward such that said spring is restrained to rotate less than 360° about said longitudinal axis.

11. A decoy assembly comprising:

an animal decoy body; a mounting mechanism for said animal decoy, comprising a ground-carried first part and a second part affixed to the animal decoy body, wherein the first part and the second part are relatively rotatable about a substantially vertical axis relative to the decoy body, over a span limited to less than 360 degrees;

wherein the mounting mechanism comprises a resilient member having a flexing direction aligned to a longitudinal midplane of the animal decoy body, such that the animal decoy body flexes substantially only in a fore and aft direction; and, wherein the body is hollow and has a longitudinally extending slot, one of said ground carried first part and said second part extending through the slot, whereby clearance with the slot fixes a direction in which the decoy body can bob.

12. The decoy assembly of claim 11, wherein the ground engaging first part comprises a tubular portion and the stop reduces an inside diameter of the tubular portion to less than a width of the blade-like spring.

13. The decoy assembly of claim 11, wherein the stop defines an angular span of less than 90 degrees.

* * * * *